Figure 1:
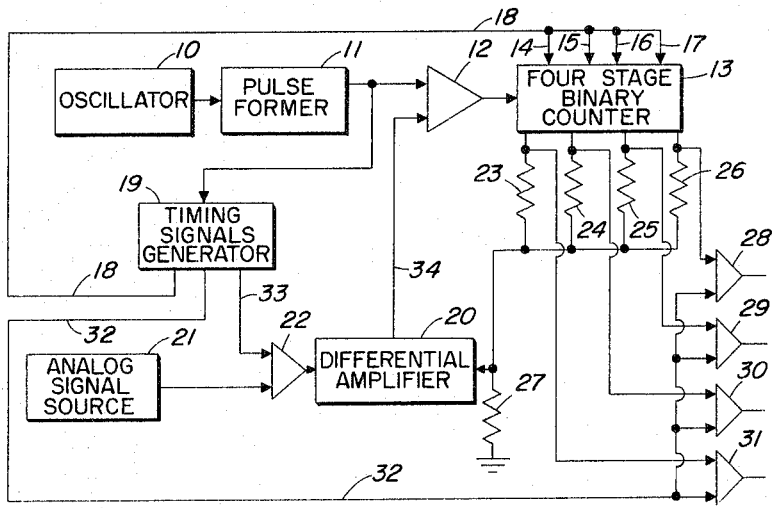

Sept. 27, 1966 F. SECRETAN 3,276,012
ANALOG-TO-DIGITAL CONVERTER
Filed Dec. 26, 1963 2 Sheets-Sheet 1

INVENTOR.
FRANK SECRETAN
BY Moody and Phillion
ATTORNEYS

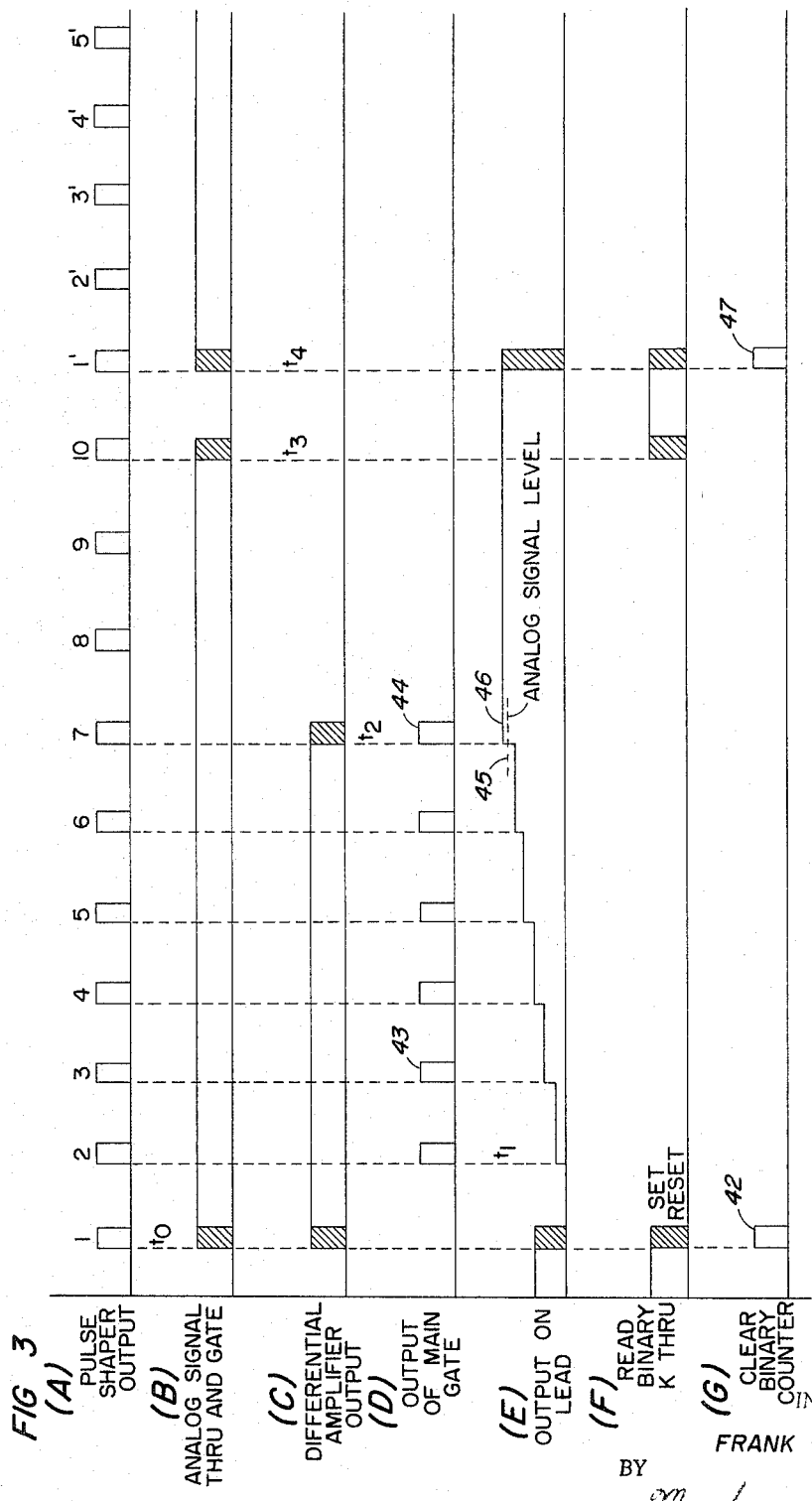

United States Patent Office

3,276,012
Patented Sept. 27, 1966

3,276,012
ANALOG-TO-DIGITAL CONVERTER
Frank Secretan, Santa Ana, Calif., assignor to Collins Radio Company, Cedar Rapids, Iowa, a corporation of Iowa
Filed Dec. 26, 1963, Ser. No. 333,314
7 Claims. (Cl. 340—347)

This invention relates generally to analog-to-digital converters and, more specifically, to the type analog-to-digital converter employing a pulse generator, which at regular time intervals, supplies a number of pulses to a counter; the number of pulses being determined by the magnitude of an analog signal during any given time interval.

Analog-to-digital conversion units are widely employed today. Many of the activities people engage in involve analog type measurements, such as cutting things, shaping things, mixing things, weighing things, and in general, the measuring of various quantities by analog means. On a more sophisticated level, the signals generated in the various parts of autopilots are analog signals. The signals appearing in electrical meters, such as ammeters and voltmeters, pressure meters, etc. are analog measurements. In many instances it is desired to combine such analog measurements in certain ways and perform computations based on the values of the analog measurements and the relations between them. In order to perform such computations accurately and speedily, it is frequently desirable to convert such information into digital information, and then to perform the computations in a digital computer. To transform such analog information into digital information requires an analog-to-digital converter.

In the prior art, one type of analog-to-digital converter employs a counter. The analog signal, or a sample thereof, is supplied to a gate which opens in response thereto to supply pulses from a pulse generator source to a counter. A linearly increasing reference voltage is gated on at the beginning of counting by the counter. When the magnitude of the reference voltage reaches the magnitude of the sampled analog voltage, the gate is closed so that the pulse source is disconnected from the counter. Thus, the counter contains a count which is proportional to the magnitude of the sampled analog voltage. Such count can then be transformed into any desired digital form, such as binary or decimal, and supplied to a digital computer.

A primary object of the present invention is to provide an analog-to-digital converter in which a simple resistive network is employed at the output of the counter both to provide the converted information in coded form and also to function as the digital-to-analog converter for the output of the counter, to provide said reference voltage.

A second object of the invention is to provide an improved analog-to-digital converter of the counter type employing a binary counter and in which the reference or comparison voltage is extracted directly from the output terminals of the said binary counter.

A third purpose of the invention is the improvement of analog-to-digital converters, generally.

In accordance with the invention there is provided a counter such as a binary counter, a pulse generating means, and a gate connecting the output of the pulse generating means to the counter. When opened, the said gate will supply pulses to the counter to cause the counter to count. A digital-to-analog converter consisting of a plurality of weighted resistors is connected to the various outputs of the counter and responds to the count therein to generate a D.-C. voltage whose magnitude is proportional to the count therein. Voltage comparison means is provided to compare the analog signal and the output signal from the digital-to-analog circuit to control said gating means. As long as the analog signal exceeds the output of the digital-to-analog circuit means, the gate will be opened to permit pulses to enter the counter. When the output voltage of the digital-to-analog converter equals the sampled analog signal, the gate will be closed.

In accordance with one feature of the invention, the binary counter has the outputs from each of the stages thereof connected to a common load resistor through individual weighted resistors connected in parallel. The current through each of the weighted resistors is such as to represent the magnitude of count of the particular stage to which the resistor is connected; thus, the stage representing $2^3$ would have four times as much current flowing through its weighted resistor as the stage representing $2^1$. All such current flows through the common resistor to ground to produce across said common load resistor a voltage proportional to the count contained in the binary counter.

Figure 2:
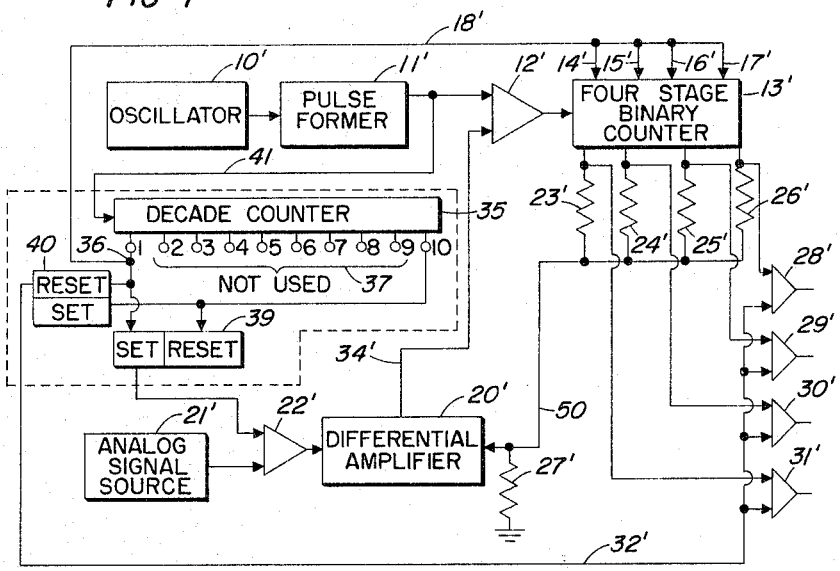
Figure 4:
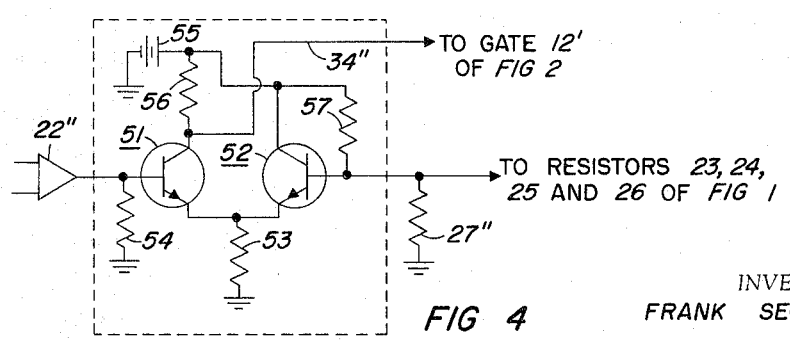

The above-mentioned and other features and objects of the invention will be more fully understood from the following detailed description thereof when read in conjunction with the drawings, in which:

FIG. 1 is a general block diagram of the invention;
FIG. 2 is a more detailed block diagram of the invention;
FIG. 3 is a set of waveforms which show the timing signals and timing relationships employed in the operation of the circuit; and
FIG. 4 is a schematic diagram of a differential amplifier which can be used with the invention.

Referring now to FIG. 1, the output of the analog signal source is sampled by means of AND gate 22 and a timing signal from generator 19 through lead 33, which functions to open the AND gate 22 during the sampling period. The specific means for obtaining the timing signals of generator 19 will be discussed in connection with FIG. 2.

The sampled analog signal is supplied through AND gate 22 to differential amplifier 20 which compares the sampled analog signal with the signal appearing across the common load resistor 27. As long as the magnitude of the analog signal exceeds that of the voltage appearing across resistor 27, there will appear on the output lead 34 of the differential amplifier 20, a voltage which will open the gate 12.

When the gate 12 is opened, pulses generated by oscillator 10 and pulse former 11 will pass through the gate 12 into the binary counter 13, which is shown in FIG. 1 as being a four-stage binary counter. It is to be understood, however, that the binary counter 13 could be a five-stage counter, a six-stage counter, a seven-stage counter, or any number stage binary counter required for a particular application.

The resistors 23, 24, 25, and 26 are connected to the outputs of each of the four stages of the binary counter 13, and are weighted in such a manner that the current therethrough will correspond to the count of the particular stage represented. More specifically, assume that resistor 23 represents the first stage, that is the $2^0$ count of the binary counter; resistor 24 represents a count of $2^1$; resistor 25 represents a count of $2^2$; and resistor 26 is connected to the stage representing the count of $2^3$. The binary counter 13 preferably should be designed to constitute a high impedance source for the currents supplied to the resistors 23–26, so that regardless of the voltage created across the common resistor 27 as a result of different current combinations flowing through the resistors 23–26, the amount of current flowing through any one of said resistors 23–26 will be constant.

For purposes of discussing the preferred embodiment of the invention being described herein, assume the current flow through the resistor 26 to have a normalized value of 8 units; the current flow through the resistor 25 to have a normalized value of four units; the current through resistor 24 to have a normalized value of two units; and the current flow through resistor 23 to have a normalized value of one unit. It is to be understood that current will flow through the resistors 23–26 only when the particular stage thereof is in the set condition; that is, when that particular stage contains a binary 1.

When the voltage across the common resistor 27 equals or exceeds that of the sampled analog signal from source 21, the gate 12 will be closed and counting in the binary counter 13 will terminate. At this time, the count contained in the binary counter can be read through output AND gates 28, 29, 30, and 31, which will be activated by a read signal appearing on read lead 32 and generated by the timing signal generator 19. The binary counter 13 can then be cleared by a reset signal supplied from timing signal generator 19 through reset lead 18 to each of the reset leads 14, 15, 16, and 17 of the binary counter 13. The circuit of FIG. 1 is then ready to receive the next sampled analog signal from source 21 and to repeat the process of converting said next sampled analog signal to digital form.

In FIG. 3 there is shown the timing waveforms along with certain other waveforms relating to the circuits of FIG. 1 and FIG. 2. More specifically, in FIG. 1 curve A shows the pulses appearing at the output of pulse former 11. Such pulses can be seen to be fairly short pulses and occurring at a constant rate. Curve B represents the periods of analog signal supplied through AND gate 22 to differential amplifier 20, which periods are determined by a timing signal supplied from generator 10 to AND gate 22. The timing signal generator 19 is under control of the pulses from pulse former 11. Thus, it can be said that AND gate 22 is opened at the beginning of pulse 1 of curve 3A and closed by pulse 10 (curve 3A) of the pulses supplied from pulse former 11. The cycle then repeats with each subsequent 10 pulses. As will be seen more clearly later, the use of groups of 10 pulses is not mandatory and depends to a large extent on the number of stages of the binary counter 13.

The gate 12 is opened by the output of differential amplifier 20, which exists as long as the analog signal from source 21 is greater than the D.-C. voltage occurring across resistor 27. In FIG. 3C it has been arbitrarily assumed, for discussion purposes, that a voltage across resistor 27 will equal that from the analog source 21 after pulse number 7 has passed into the binary counter 13. Actually, this 7th pulse is really only the 6th pulse to enter the binary counter since pulse No. 1 is employed solely to set flip-flop 39, thus opening gates 22 and 12, reset counter 13, and reset flip-flop 40. The counter 13 is energized only by the leading edge of the pulses supplied thereto.

FIG. 3D shows the six pulses that actually pass through the gate 12 into the binary counter 13 to produce the output voltage across resistor 27, as shown in the waveform of FIG. 3E. As the pulses of FIG. 3D enter the binary counter and various stages thereof register binary 1's in accordance with the count contained therein, currents will flow through the weighted resistors 23–26, and will pass through the common register 27 to produce a voltage thereacross which is proportional to the count contained in the counter. For example, with six pulses entered into the binary counter, a current of normalized value 2 will flow through the resistor 24, and a current of normalized value 4 will flow through the resistor 25 to produce a resultant current of normalized value 6 through the resistor 27. Such resultant current will produce a voltage across resistor 27 representative of a count of six in binary counter 13. As each count is entered into the binary counter, the voltage across resistor 27 increases incrementally, as shown in FIG. 3E.

In the particular embodiment of FIG. 1, the four-stage binary counter is capable of receiving eight counts before recycling. Consequently, the use of a cycle of 10 pulses is employed, with the first pulse from the pulse former 11 being used to clear the binary counter and the 10th pulse being employed to initiate a read of the contents of the binary counter. The clearing pulses are shown in the waveform FIG. 3G and the read pulses are shown in FIG. 3F.

Referring now to the circuit of FIG. 2, there is shown a more detailed block diagram of the invention. In FIG. 2, blocks corresponding to blocks in FIG. 1 are identified by the same reference character, although primed.

In FIG. 2, the only difference from the diagram of FIG. 1 is that the timing signal generator 19' is shown in considerably more detail. More specifically, in FIG. 2, the timing signal generator 19' is comprised of a decade counter 35 having 10 outputs, a first flip-flop circuit 39 and a second flip-flop circuit 40. The decade counter 35 is driven directly by the output pulses of the pulse former 11' and counts in cycles of 10. The pulses marked 1 through 10 of FIG. 3A appear, respectively, on the corresponding output leads of decade counter 35 as indicated by the numbers 1 through 10 thereon.

In the operation of the circuit, pulse 1 generated by the decade counter and appearing on output lead 36 thereof, functions to set flip-flop 39 and open AND gate 22'. Such pulse occurs at time $t_0$ in FIG. 3A and will hold the AND gate 22 in an open condition until time $t_3$. The differential amplifier 20' will respond to the analog signal from source 21' to produce a D.-C. output voltage on lead 34'. Such D.-C. output voltage is shown in FIG. 3C, and functions to open gate 12' to permit pulses from pulse former 11' to enter the binary counter 13'. The pulses entered into binary counter 13' are represented in the waveform of FIG. 3D.

With the reception of each pulse, the stages of the binary counter will change their states in accordance therewith. Thus, when the first pulse is received, the first stage of the binary counter will contain a 1 and the other three stages will contain 0's. Since the first stage contains a 1, a current will flow through the resistor 23' individual to stage 1 and through the common resistor 27' to ground. Such current will be of the magnitude as indicated hereinbefore indicative of the count of $2°=1$ (normalized value). When the second pulse 43 of FIG. 3D is received, stage 1 will return to its zero state and stage 2 of the binary counter will change to its binary 1 state, so that a current will flow through resistor 24' and the common resistor 27' to ground. The current through resistor 24', however, will have a normalized value of 2, since the second stage now contains a binary 1.

When the sixth pulse 44 is received, stages 2 and 3 of the binary counter will contain 1's and the current will be flowing through resistors 24 and 25 in parallel and then through the common resistor 27' to ground. It has been assumed in this example that upon the reception of the sixth pulse the voltage across resistor 27' will exceed the analog voltage being supplied from the analog source 21' through AND gate 22'. In FIG. 3E the dotted line 45 represents the level of the analog voltage supplied from source 21 and it can be seen that upon the reception of pulse 44, FIG. 3D, the voltage across resistor 27' will rise to a level 46, as shown in FIG. 3E, which will exceed the level of the analog voltage from source 21'.

A differential amplifier 20' will thereby be cut off so that no signal will appear on the lead 34'. In FIG. 3C it can be seen that the differential amplifier output terminates at time $t_2$ upon the reception of pulse 44 of FIG. 3D. Thus, the gate 12 is closed and the supplying of pulses from pulse former 11 to the binary counter 13' is terminated.

At the count of 10 the decade counter supplies a pulse to its output lead 38, which pulse performs two functions. One of these functions is to close gate 22' to prevent the signal from the analog source 21' from being supplied to differential amplifier 20'. Reference is made to the curve of FIG. 3B which shows the analog signal supplied to differential amplifier 20' being terminated at time $t_3$ when pulse 10 from decade counter 35 occurs.

The second function of the pulse 10 of decade counter 35 is to set the flip-flop 40 which functions to open gates 28'–31', thus permitting the information contained in the four stage binary counter 13' to be read at the outputs of AND gates 28'–31'. The circuit into which the contents of the binary counter 13' are read is not shown in the drawings since it does not form a part of the invention.

At time $t_4$ the cycle will begin anew. The next pulse from pulse former 11', designated as pulse 1' in FIG. 3A, will cause the decade counter to produce an output pulse on its "1" digit output lead 36, to perform the functions stated hereinbefore. In more detail pulse 1' will reset the four stages of the binary counter 13' through lead 18'. Such reset pulse is shown as pulse 47 of FIG. 3G. Secondly, the digit "1" pulse from counter 35 will reset the flip-flop 40' to close AND gates 28'–31', thus terminating the read signal of FIG. 3F.

The third function of the "1" digit pulse appearing on output lead 36 of counter 35 is to set the flip-flop 39, thus opening gate 22' and permitting the signal from the analog signal source 21' to be supplied to differential amplifier 20'.

Referring now to FIG. 4, there is shown a form of a differential amplifier which can be employed in the block 20' of FIG. 2. In the absence of a positive signal supplied to the base electrodes of either transistor 51 or 52, the transistors 51 and 52 will be cut off. However, when a positive signal from the analog source 21' of FIG. 2 is supplied through AND gate 22'' to the base of transistor 51, the said transistor 51 will become conductive to produce a change in voltage across the collector resistor 56, which voltage will open the gate 12' of FIG. 2 through lead 34''. As the count in the binary counter 13' of FIG. 2 increases and the voltage across resistor 27' increases to the point where it is greater than the voltage supply from the analog signal source 21', the transistor 52 will become conductive and will increase the voltage across the common emitter resistor 53 to cut off transistor 51. Thus, the voltage on lead 34'' will be decreased to cause the closing of gate 12' of FIG. 2.

It is to be understood that the form of the invention shown and described herein is a preferred embodiment thereof, and that various changes may be made therein without departing from the spirit or the scope of the invention.

I claim:

1. Analog-to-digital converting means for converting an analog signal to a digital signal and comprising:
   counter means having input means and a plurality of stages;
   pulse forming means for generating a continuous supply of pulses;
   first gating means constructed when opened, to supply pulses from said pulse forming means to said counter means,
   first impedance means responsive to the condition of each stage of said counter means to produce first signals representative of the condition of the stages of said counter means,
   second impedance means responsive to the signals produced by said first impedance means to produce a second signal representative of the total count contained in said counter means,
   signal comparing means responsive to the said second signal and to said analog signal to produce an output signal having a first characteristic when the ratio of the magnitude of said analog signal to the magnitude of said second signal exceeds a predetermined value, and to produce an output signal having a second characteristic when the ratio of the magnitude of said second signal to said analog signal exceeds a predetermined value,
   said first gating means responsive to the signal comparing means output signal having said first characteristic to become opened;
   and control means for supplying said analog signal to said signal comparing means at regularly spaced time intervals and to clear said counter means prior to each of said time intervals.

2. Analog-to-digital converting means in accordance with claim 1 in which said control means comprises timing means and second gating means responsive to an output signal from said timing means to supply said analog signal to said signal comparing means.

3. Analog-to-digital converting means in accordance with claim 2 comprising:
   output means individual to each stage of said counter means;
   each of said output means comprising an individual output terminal and individual third AND gate means;
   and in which said timing means is constructed to supply a sampling signal to each of said third AND gate means at the end of each of said regularly spaced time intervals;
   said third AND gate means responsive to said sampling signal to become opened to supply the signals representing the condition of each stage of said counter to said output terminals.

4. Analog-to-digital converting means in accordance with claim 3 in which said timing means comprises:
   decimal counter means having a plurality of stages and which advances one count in response to each pulse from said pulse forming means;
   said decimal counter means further comprising means for supplying output signals from selected ones of said stages thereof to said second gating means to open and close said second gating means, to said third AND gating means to open and close said third AND gating means, and to said first counter means to clear said first counter means.

5. Analog-to-digital converting means for converting an analog signal to a digital signal and comprising:
   binary counter means having a plurality of stages with each stage having at least one output terminal;
   pulse forming means for generating a continuous supply of pulses at a continuous rate;
   first gating means constructed when opened to supply said pulses to the input of said binary counter means,
   a plurality of resistive means individually connected one each to the output terminals of said plurality of stages of said binary counter means;
   each of said resistive means being weighted in value so that the signal therethrough when the stage contains a binary count is representative of the count of said stage,
   adding means for adding the signals present in each of said weighted resistive means to produce a resultant signal which is representative of the total count contained in said binary counter means,
   timing signal generating means,
   signal comparing means responsive to said resultant signal and the supplied analog signal to produce a first signal when the ratio of said analog signal to said resultant signal exceeds a certain value and to produce a second signal when the ratio of said resultant signal to said analog signal exceeds a certain value,
   said first gating means responsive to said first signal to become opened to cause the supplying of pulses to the input of said binary counting means and to become closed in response to the said second signal,
   and second gating means responsive to timing signals from said timing signal generating means to gate the analog signal to said signal comparing means during regular periodic time intervals of predetermined length.

6. Analog-to-digital converting means in accordance with claim 5 comprising output means individual to each stage of said binary counter means, each of said output means comprising an output terminal and individual third AND gate means, said timing means constructed to supply a sampling signal to each of said third AND gate means at the end of each of said regular time intervals;

said third AND gate means responsive to said sampling signal to become opened to supply the signals representing the count of each stage to the said output terminals.

7. Analog-to-digital converting means in accordance with claim 6 in which said timing means comprises:

decimal counter means having a plurality of stages and which advances one count in response to each pulse from said pulse forming means;

said decimal counter means further comprising means for supplying output signals from selected ones of said stages thereof to said second gating means to open and close said second gating means, to said third AND gating means to open and close said third AND gating means, and to said binary counter means to clear said binary counter means.

No references cited.

MAYNARD R. WILBUR, *Primary Examiner.*

K. R. STEVENS, *Assistant Examiner.*